United States Patent [19]

Lowe, Jr.

[11] Patent Number: 4,848,955
[45] Date of Patent: Jul. 18, 1989

[54] ANTI-THEFT COLLAR

[76] Inventor: Ed W. Lowe, Jr., 4231 W. Hillside Dr., Sapulpa, Okla. 74066

[21] Appl. No.: 127,907

[22] Filed: Dec. 2, 1987

[51] Int. Cl.⁴ ............................................... B25G 3/00
[52] U.S. Cl. ..................... 403/344; 403/374; 24/268; 24/20 EE; 70/417; 180/287
[58] Field of Search .............. 24/268, 20 EE, 23 EE, 24/25; 403/374, 344; 285/421, 252, 249; 70/417; 180/287

[56] References Cited

U.S. PATENT DOCUMENTS

| | | |
|---|---|---|
| 106,527 | 8/1870 | Woodruff ........................ 24/268 X |
| 1,727,038 | 9/1929 | Rousey . |
| 2,258,911 | 10/1941 | Skoko ........................... 285/421 X |
| 3,350,755 | 11/1967 | Hanner ................................ 24/263 |
| 3,360,894 | 1/1968 | Sharman et al. .................... 52/108 |
| 3,665,738 | 5/1972 | Pescuma et al. .................... 70/211 |
| 3,916,658 | 11/1975 | Barry ................................ 70/417 |
| 3,949,155 | 4/1976 | Bourne ......................... 403/374 X |
| 4,008,589 | 2/1977 | Harrell .............................. 70/424 |
| 4,020,662 | 5/1977 | Fowler .............................. 70/237 |
| 4,062,193 | 12/1977 | Deleto ................................ 70/18 |
| 4,098,102 | 7/1978 | Kalina ............................... 70/237 |
| 4,104,895 | 7/1978 | Kalina ............................... 70/237 |
| 4,167,222 | 9/1983 | El Bindari ........................ 180/287 |
| 4,367,571 | 1/1983 | Speirs et al. ....................... 24/249 |
| 4,399,593 | 8/1983 | De Bradandere et al. ............. 24/25 |
| 4,478,437 | 10/1984 | Skinner ........................... 285/189 |
| 4,598,562 | 7/1986 | Freeman ........................... 70/237 |
| 4,627,514 | 12/1986 | Brown ............................. 180/287 |
| 4,674,778 | 6/1987 | Ruiz ............................. 292/256.6 |

FOREIGN PATENT DOCUMENTS 228778 2/1925 United Kingdom ................ 24/268

Primary Examiner—Andrew V. Kundrat
Attorney, Agent, or Firm—Mark G. Kachigian

[57] ABSTRACT

An anti-theft collar device for an automobile or other vehicle having a cylindrical steering wheel and an extending shift lever. A resilient, arcuate band includes a first end having a member extending therefrom curled radially inward to form a first end slot, a second end, an opening spaced from the first end, and an aperture to accommodate the shift lever therethrough. A tongue extends circumferentially from the second end and is adapted to be inserted through the opening in the band. The tongue terminates in a member curled radially inward to form a second end slot parallel and opposed to the first end slot. A wedge has a pair of opposed edges that may be slidably received in the slots and a wedge lock prevents removal of the wedge from the slots. The arcuate band may be formed around the cylindrical steering wheel column, the tongue may be inserted through the opening in the band to form a pair of parallel, opposed slots. The wedge may then be slidably inserted between the slots and the wedge lock will prevent removal of the wedge from the slots and prevent removal of the band from the steering wheel column.

2 Claims, 3 Drawing Sheets

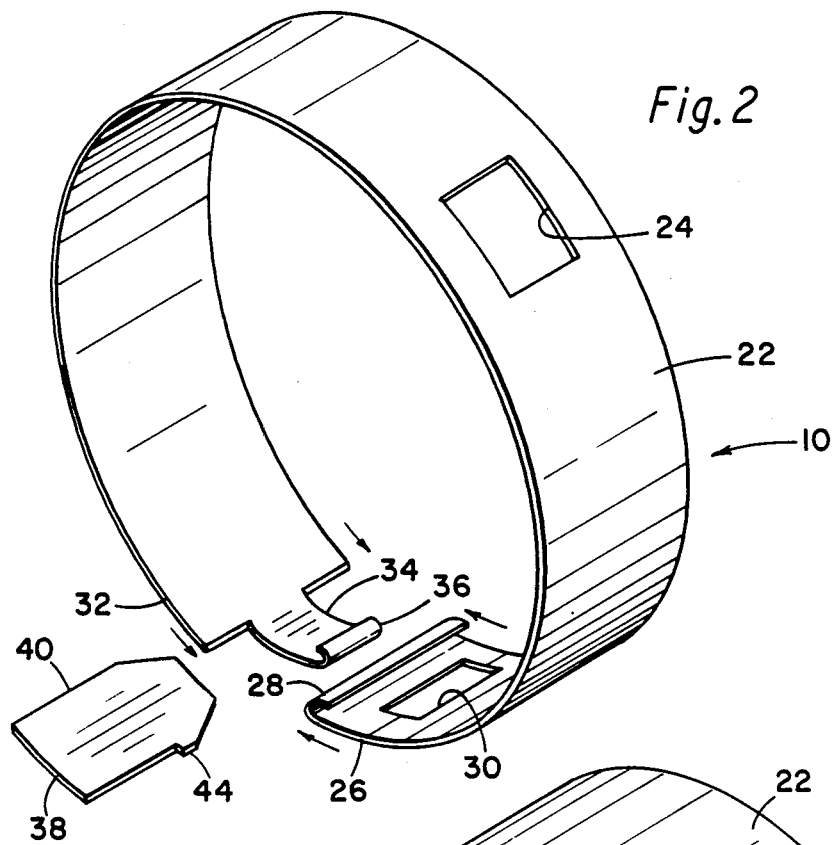
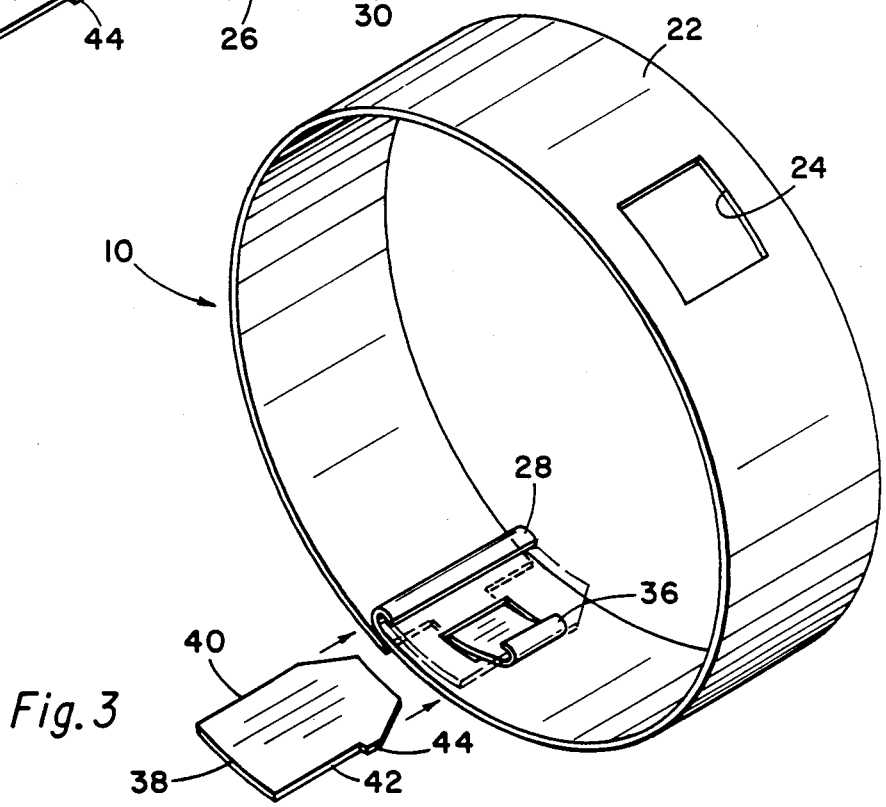

ANTI-THEFT COLLAR

BACKGROUND OF THE INVENTION

1. Field of the Invention

The present invention relates to an anti-theft device of automobiles or other vehicles. More particularly, the invention is directed to an anti-theft device adapted to encirle a steering wheel column of an automobile or other vehicle in order to prevent unauthorized access to components within the steering wheel column.

2. Description of the Prior Art

Automotive theft is a serious problem in this country and a growing one. The ignition switch in many vehicles is often located beneath the dash and is connected to and activated by an ignition lock through a rod and rack assembly. In many automobiles, the steering wheel column has a thin plastic or cast aluminum cover that can be easily broken. Once this is done, the steering column and its components are readily exposed. The ignition circuit can then be activated by an experienced thief using a screwdriver or other implement. In particular, this has been a problem for nearly all General Motors vehicles since the mid 1970's.

Various devices have been employed to prevent unauthorized access into the ignition lock. A few devices have been employed to prevent unauthorized access into the steering column of an automobile. A patentability search was conducted on the present invention and the following U.S. Patents were uncovered:

| PATENT NO. | PATENTEE | ISSUE DATE |
|---|---|---|
| 1,727,038 | Rousey | September 3, 1929 |
| 3,350,755 | Hanner | November 7, 1967 |
| 3,360,894 | Sharman et al | January 2, 1968 |
| 3,665,738 | Pescuma et al | May 30, 1972 |
| 3,916,658 | Barry | November 4, 1975 |
| 4,008,589 | Harrell | February 22, 1977 |
| 4,020,662 | Fowler | May 3, 1977 |
| 4,062,193 | Deleto | December 13, 1977 |
| 4,098,102 | Kalina | July 4, 1978 |
| 4,104,895 | Tankel | August 8, 1978 |
| 4,167,222 | El Bindari | September 11, 1979 |
| 4,367,571 | Speirs et al | January 11, 1983 |
| 4,399,593 | De Bradandere et al | August 23, 1983 |
| 4,478,437 | Skinner | October 23, 1984 |
| 4,598,562 | Freeman | July 8, 1986 |
| 4,627,514 | Brown | December 9, 1986 |
| 4,674,778 | Ruiz | June 23, 1987 |

El Bindari (U.S. Pat. No. 4,167,222) discloses a collar to prevent access to the ignition key. The collar is split either at the ignition key or split into two halves which are joined by screws with threads that strip. In contrast, present invention provides a collar around the steering column adjacent the shift lever. The present invention may be installed in a simple fashion without the necessity of screws or any other fasteners.

Brown (U.S. Pat. No. 4,627,514) discloses a two-piece collar which is connected together with hinges and one-way screws. Again, the present invention is simpler and easier to install. Further, the present invention is visually less obtrusive.

Several devices disclose types of housing which prevent any access to the ignition itself. Barry (U.S. Pat. No. 3,916,658) discloses a two-piece collar surrounding the ignition switch lock which is connected by one-way screws.

Various types of wedges are known to secure or lock a device such as Rousey (U.S. Pat. No. 1,727,038), Hanner (U.S. Pat. No. 3,350,755) and De Bradander et al (U.S. Pat. No. 4,399,593).

Accordingly, it is a principal purpose and object of the present invention to provide an anti-theft collar for an automobile or other vehicle which is simple in construction and may be installed without necessity of screws or other fasteners.

It is a further purpose and object of the present invention to provide an anti-theft collar which is visually appealing and unobtrusive.

It is an additional purpose and object of the present invention to provide an anti-theft collar which is tamper-proof and permanently affixed to the steering column.

SUMMARY OF THE INVENTION

An anti-theft collar of the present invention prevents unauthorized access to the interior of the steering wheel column and its components. The anti-theft collar snugly encircles and surrounds the steering wheel column beneath the steering wheel and the ignition lock and adjacent the shift lever.

The anti-theft collar includes a thin, arcuated resilient band. An aperture is provided in the band in order to accommodate the shift lever and avoid any interference therewith. The arcuate band has a first end which terminates in a member curled radially inward to form a first end slot. Spaced from the first end is an opening in the arcuate band. A second end of the band has a circumferentially extending tongue which terminates in a member curled radially inward to form a slot parallel and opposed to the first end slot.

The first end and second end can be brought together and the tongue inserted into the aperture so that the slots are parallel and opposed to each other within the collar. A wedge having a pair of opposed edges may thereupon be slidably inserted into the slots. A protruding portion extends from one edge of the wedge corresponding to the second end slot. The protruding portion slides into the second end slot along with the edge. After the protruding portion has passed through the second end slot, the slot will be drawn against the edge. The wedge may not be withdrawn since the protruding portion acts as a catch. The wedge may not be pushed further since the collar is in close proximity to the dash of the vehicle. The collar is, thus, permanently installed around the steering wheel column.

BRIEF DESCRIPTION OF THE DRAWINGS

FIG. 2 is an exploded, perspective view of the present invention shown in FIG. 1 apart from the automobile;

FIG. 3 is a perspective view of the present invention shown in FIG. 1;

DETAILED DESCRIPTION OF THE PREFERRED EMBODIMENTS

Figure 1:
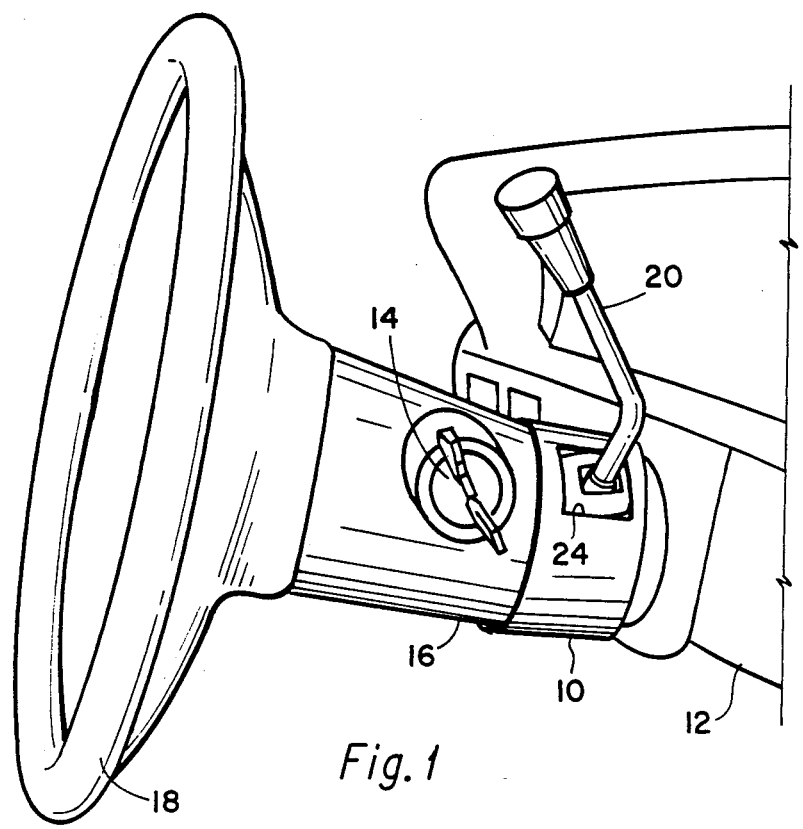
FIG. 1 is a perspective view of an anti-theft collar constructed in accordance with the present invention shown installed in an automobile.

Referring to the drawings in detail, FIG. 1 shows an anti-theft collar 10 constructed in accordance with the present invention installed and in use in an automobile. As will be described, once the collar 10 is installed, it is tamper-proof and permanently affixed.

The ignition switch (not shown) in many vehicles is often located beneath the dash 12 and is connected to and activated by an ignition lock 14 through a rod and rack assembly (not shown) within a steering wheel column 16. If access could be gained to the rod and rack assembly within the steering column, the ignition lock and steering wheel lock could be bypassed. Since the steering wheel column is often covered by a thin plastic or cast aluminum shell, experienced theives have been able to crack the plastic shell and manipulate the rack and rod assembly with a screwdriver or other implement. An experienced thief can accomplish the foregoing in a brief period and start the vehicle. This problem has been particularly acute in nearly all General Motors vehicles manufactured since the mid-1970's. The foregoing does not constitute the present invention but illustrates the problem to be solved.

The present invention 10 operates by preventing unauthorized access to the interior of the steering wheel column and its components, thereby thwarting a thief.

With reference to FIG. 1, a typical steering wheel column 16 is cylindrical in shape and is often of a standard diameter. When installed, the anti-theft collar 10 snugly encircles and surrounds the steering wheel column 16 beneath steering wheel 18 and ignition lock 14 and adjacent shift lever 20 which extends from the column 16.

The anti-theft collar 10 includes a thin, arcuate band 22 constructed of resilient stainless steel. It should be understood that the band may be constructed of another material which is flexible and resilient yet not easily broken. An aperture 24 is provided in the band 22 to accommodate the shift lever 20 and avoid any interference therewith.

FIGS. 2 and 3 show the present invention 10 apart from the vehicle steering wheel column. The arcuate band 22 may be formed to an annular shape as shown by the direction of the arrows in FIG. 2. The band 22 has a first end 26 which terminates in a member curled radially inward to form a first end slot 28. Spaced from the first end 26 is an opening 30 in the arcuate band 22. The band 22 has a second end 32 having a circumferentially extending tongue 34. The tongue terminates in a member curled radially inward to form a second end slot 36 which is parallel and opposed to the first end slot 28.

As seen in FIG. 2, the ends 26 and 32 can be brought together by exerting pressure on the band. It should be recalled that the band is flexible and resilient so the ends can be brought together without difficulty. The tongue 34 can then be inserted into an opening 30, as shown in FIG. 3, to form an annular collar. With this accomplished, the tongue 34 is interior to the collar and the slots 28 and 36 are parallel and opposed to each other within the collar.

With the band held in position, a wedge 38 may be slidably inserted in the slots. Once the wedge has been inserted and the band released, the resilience of the band will cause slots 28 and 36 to be drawn snugly against edges 40 and 42, respectively, of the wedge 38.

Figure 4:
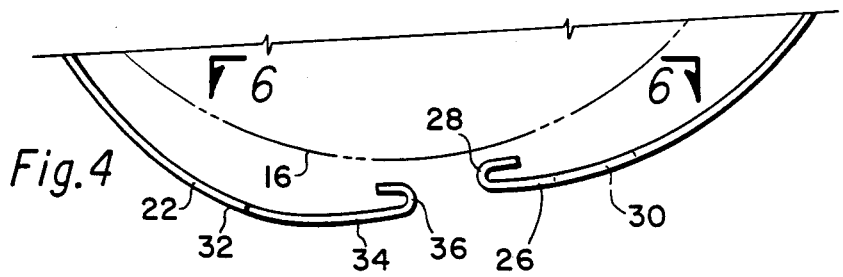
FIG. 4 is a partial view of the present invention shown in FIG. 1.
Figure 5:
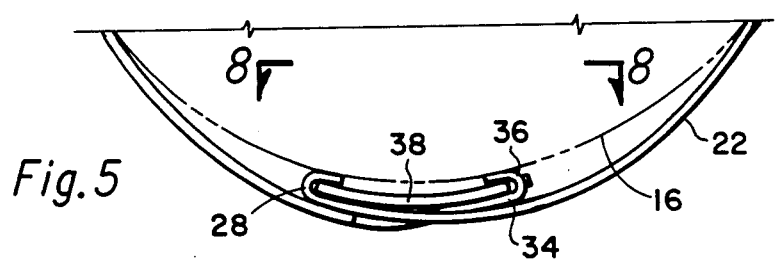
FIG. 5 is a partial view of the present invention shown in FIG. 1.

Another view of the relationship between the slots 28 and 36 and the edges 40 and 42 of the wedge 38 is seen in the partial view shown in FIGS. 4 and 5. The steering column 16 is illustrated by the broken lines. To install the collar 10 around the steering wheel column, the shiftlever 20 is placed through the aperture 24. The ends 26 and 32 are pulled apart from each other far enough so that the band will slip over the steering wheel column. In FIG. 4, the arcuate band 22 is shown in place around the steering column. In order to permanently lock the collar in place around the steering column, the first end 26 and the second end 32 of the arcuate band are brought together by exerting pressure on the arcuate band. The tongue 34 is then inserted through the opening 30 so that both slots 28 and 36 are interior to the collar thus formed. The slots are thereupon parallel to each other and opposed. As seen in FIG. 5, the wedge 38 may then be inserted in the slots 28 and 36. When the band is released, the resilience of the band will draw the slots 28 and 36 toward each other and snugly against edges 40 and 41 of the wedge.

Figure 6:
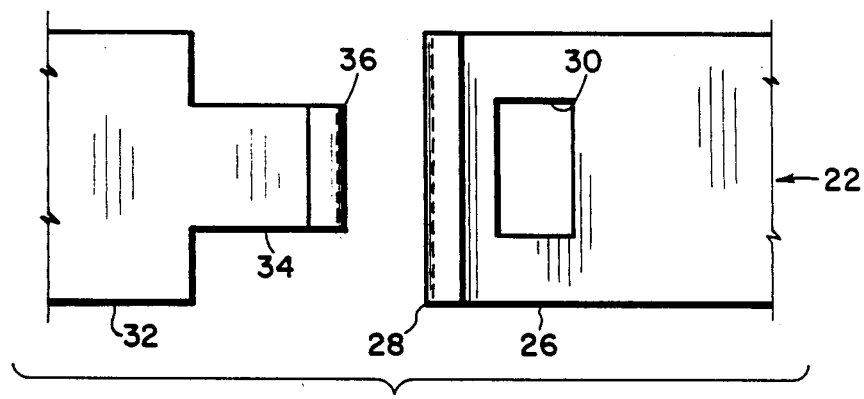
FIG. 6 is a sectional view of the present invention taken along section lines 6—6 of FIG. 4.
Figure 7:
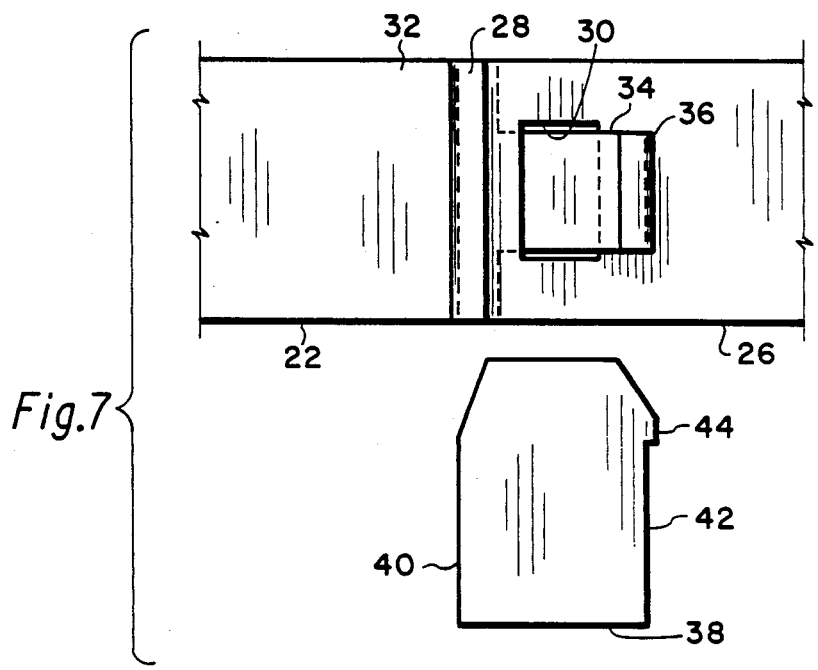
FIG. 7 is a partial view of the present invention shown in FIG. 1.
Figure 8:
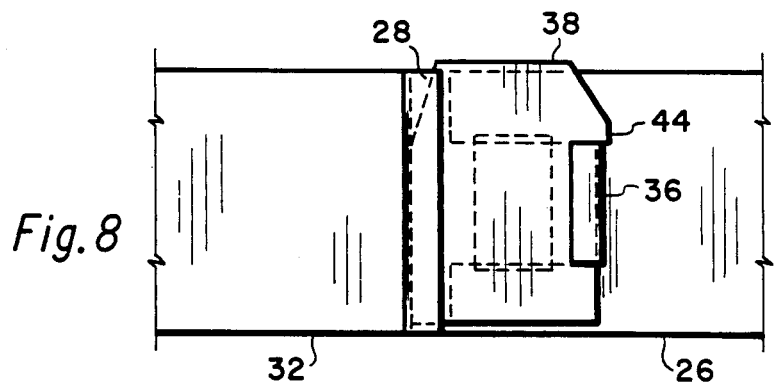
FIG. 8 is a sectional view of the present invention taken along section lines 8—8 of FIG. 5.

The system of locking the wedge 38 in place for a permanent installation is best illustrated in FIGS. 6, 7, and 8. The first end 26 and the second 32 are shown apart from each other prior to installation in FIG. 5. This partial view corresponds to the views shown in FIGS. 2 and 4.

In FIG. 7, the ends 26 and 32 of the arcuate band 22 have been brought together with the tongue 34 inserted into the opening 30. The first end slot 28 is thereupon parallel and opposed to the second end slot 36. The slots 28 and 36 are within and interior to the collar. Before the wedge 38 is inserted in the slots, the ends are pushed together further than the final locked position to allow easy passage of the wedge into the slots.

The edges 40 and 41 of the wedge 38 correspond to the slots 28 and 36, respectively. Second end slot 36 is shorter than first end slot 28. Edge 42 has a protruding portion 44 extending therefrom. The protruding portion 44 will slide into the slot 36 along with edge 42. After the protruding portion 44 has passed through the slot 36, the second end slot 36 will be drawn against edge 42.

FIG. 8 shows the final locked position. The wedge 38 has been inserted into the slots and the protruding portion has passed entirely through the slot 36. The wedge 38 cannot be withdrawn from the slots since the protruding portion 44 acts as a catch.

The wedge 38 may not be withdrawn or pushed further through the slots. Returning to a consideration of FIG. 1, it can be appreciated that wedge 38 cannot be pushed further through the slots since the band 22 and wedge 38 are in close proximity to dash 12. The collar 10, therefore, permanently installed around the steering wheel column. No fasteners are required for installation and the collar is visually unobtrusive.

Whereas, the present invention has been described in particular relation to the drawings attached hereto, it should be understood that other and further modifications, apart from those shown or suggested herein, may be made within the spirit and scope of this invention.

What is claimed is:

1. An anti-theft collar device for an automobile or other vehicle having a cylindrical steering wheel column and a shift lever extending therefrom which comprises:

a. a resilient, arcuate band having a first end, a second end, an opening spaced from said first end, and an aperture to accommodate said shift lever therethrough;

b. a member extending from said first end and curled radially inward to form a first end slot;

c. a tongue extending circumferentially from said second end and adapted to be inserted through said opening in said band, said tongue terminating in a member curled radially inward to form a second end slot parallel and opposed to said first end slot;

d. a wedge having a pair of opposed edges which may be slidably received in said slots; and e. wedge lock means to prevent removal of said wedge from said slots and permanently affix said band to said steering wheel column, whereby said arcuate band may be formed around and snugly encircle said cylindrical steering wheel column, said tongue may be inserted through said opening in said band to form a pair of parallel, opposed slots interior to said band, said wedge may be slidably inserted between said slots and said wedge lock means will thereupon prevent removal of said wedge from said slots and prevent removal of said band from said steering wheel column.

2. An anti-theft collar device as set forth in claim 1 wherein said wedge lock means includes a protruding portion extending outwardly from said edge of said wedge corresponding to said second end slot, whereby said protruding portion will slide through and past said second end slot and said resilient band will draw said parallel opposed slots against said edges, thereby preventing removal of said wedge from said slots and permanently affixing said band to said steering wheel column.

* * * * *